United States Patent
Özcan et al.

(10) Patent No.: US 11,794,429 B2
(45) Date of Patent: Oct. 24, 2023

(54) HOSE EXTRUSION MANDREL AND METHOD FOR MANUFACTURING A HOSE

(71) Applicant: Eaton Intelligent Power Limited, Dublin (IE)

(72) Inventors: Gökhan Özcan, Istanbul (TR); Recep Muco, Corlu (TR); Muslum Eren, Cerkezkoy (TR); Bjoern Theberath, Kuppenheim (DE); Dipak Gopal Singh, Pune (IN); Mumin Yelman, Kapakli/Tekirdag (TR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 202 days.

(21) Appl. No.: 17/285,113

(22) PCT Filed: Oct. 14, 2019

(86) PCT No.: PCT/EP2019/077815
§ 371 (c)(1),
(2) Date: Apr. 14, 2021

(87) PCT Pub. No.: WO2020/078922
PCT Pub. Date: Apr. 23, 2020

(65) Prior Publication Data
US 2021/0354359 A1    Nov. 18, 2021

(30) Foreign Application Priority Data

Oct. 15, 2018   (IN) .............................. 201811039134
Nov. 27, 2018   (GB) ..................................... 1819276

(51) Int. Cl.
*B29D 23/00*   (2006.01)
*B29C 48/28*   (2019.01)
(Continued)

(52) U.S. Cl.
CPC .......... *B29D 23/00* (2013.01); *B29C 48/0021* (2019.02); *B29C 48/09* (2019.02);
(Continued)

(58) Field of Classification Search
CPC .. B29D 23/00; B29D 23/001; B29C 48/0021; B29C 48/09; B29C 48/15; B29C 48/21;
(Continued)

(56) References Cited

U.S. PATENT DOCUMENTS 3,414,448 A * 12/1968 Harpfer ................ B29D 23/001
                                                  156/196
3,972,757 A *  8/1976 Derderian ............ B29D 23/001
                                                  156/143
(Continued)

FOREIGN PATENT DOCUMENTS

EP   0087855 A2   9/1983
EP   1563985 A2   8/2005
(Continued)

*Primary Examiner* — Jeffrey M Wollschlager
(74) *Attorney, Agent, or Firm* — LEYDIG, VOIT & MAYER, LTD.

(57) ABSTRACT

A hose extrusion mandrel for manufacturing rubber hoses includes: a solid thermoplastic, elongate core; and a rubber compound outer layer covering a surface of the elongate core. A ratio between a diameter of the core and a thickness of the rubber compound layer may be between 8 and 11.

8 Claims, 2 Drawing Sheets

(51) Int. Cl.
    *B29C 48/09*     (2019.01)
    *B29C 48/285*     (2019.01)
    *B29C 48/15*     (2019.01)
    *B29C 48/21*     (2019.01)
    *B29C 48/00*     (2019.01)
    *B29C 70/30*     (2006.01)
    *B29K 21/00*     (2006.01)
    *B29K 105/08*     (2006.01)
    *B29L 23/00*     (2006.01)
    *B29C 48/34*     (2019.01)
    *B29C 48/32*     (2019.01)

(52) U.S. Cl.
    CPC .............. *B29C 48/15* (2019.02); *B29C 48/21* (2019.02); *B29C 48/28* (2019.02); *B29C 48/2883* (2019.02); *B29C 70/30* (2013.01); *B29C 48/32* (2019.02); *B29C 48/34* (2019.02); *B29K 2021/00* (2013.01); *B29K 2105/0827* (2013.01); *B29K 2823/12* (2013.01); *B29K 2823/16* (2013.01); *B29K 2877/00* (2013.01); *B29L 2023/005* (2013.01)

(58) Field of Classification Search
    CPC ..... B29C 48/28; B29C 48/2883; B29C 70/30; B29C 33/76; B29C 53/60; B29C 31/002; B29C 48/0015; B29C 48/30; B29C 33/50; B29C 33/505; B29C 48/32; B29C 48/34; B29K 2021/00; B29K 2105/0827; B29K 2823/12; B29K 2823/16; B29K 2877/00; B29L 2023/005; B29L 2023/22

See application file for complete search history.

(56) References Cited

U.S. PATENT DOCUMENTS

| | | | |
|---|---|---|---|
| 4,102,724 A * | 7/1978 | Taylor | F16L 11/086 |
| | | | 156/149 |
| 4,738,816 A | 4/1988 | Anderson | |
| 4,802,938 A * | 2/1989 | Kitami | B29C 48/21 |
| | | | 156/149 |
| 4,859,380 A * | 8/1989 | Ogata | B29C 48/153 |
| | | | 156/244.14 |
| 4,938,910 A * | 7/1990 | Abe | B29C 33/40 |
| | | | 525/240 |
| 2008/0302485 A1 | 12/2008 | May et al. | |

FOREIGN PATENT DOCUMENTS

| | | |
|---|---|---|
| GB | 1048788 A | 11/1966 |
| GB | 1192149 A | 5/1970 |
| GB | 1315117 A | 4/1973 |
| JP | 55144143 | * 11/1980 |
| JP | 2008132727 A | 6/2008 |

\* cited by examiner

HOSE EXTRUSION MANDREL AND METHOD FOR MANUFACTURING A HOSE

CROSS-REFERENCE TO PRIOR APPLICATIONS

This application is a U.S. National Phase application under 35 U.S.C. § 371 of International Application No. PCT/EP2019/077815, filed on Oct. 14, 2019, and claims benefit to Indian Patent Application No. IN 201811039134, filed on Oct. 15, 2018, and to British Patent Application No. GB 1819276.5, filed on Nov. 27, 2018. The International Application was published in English on Apr. 23, 2020 as WO 2020/078922 under PCT Article 21(2).

FIELD

The invention relates to a hose extrusion mandrel. Such a hose extrusion mandrel is used in a hose manufacturing process, such as for example described in EP 1563985. EP 1563985 describes an extruder, which ejects a thermoplastic mass in the form of a tube. To obtain an acceptable tolerance of the inner dimensions of the extruded tube, a solid mandrel is inserted in the extruded thermoplastic mass. The extruded tube is then advanced into a braiding station, either with the mandrel still inserted or without, such that a reinforcement layer is arranged on the extruded tube. After the braiding station, the tube with the reinforcement layer is advanced through a second extruder to cover the tube and reinforcement layer with a cover layer of thermoplastic material.

BACKGROUND

When the solid mandrel should remain in the extruded tube, while advancing the tube, then a substantial length for the mandrel is required in order to manufacture substantial lengths of tube.

It is known to use flexible plastic mandrels or rubber mandrels for the manufacturing of hoses. The advantage of flexible mandrels, is that these mandrels can be wound on a reel. Such flexible mandrels are supplied from a reel to the extruder and after finishing the tube, the mandrel can be wound on a further reel, while still being inserted into the tube. The flexible mandrel is then removed out of the tube at a later stage.

However, with increasing diameter of the hoses to be manufactured, the diameter of the required mandrel also increases. As a result of the increasing diameter, the flexibility of the mandrel is reduced, such that flexible mandrels can no longer be wound around a reel.

In order to provide more flexibility to the mandrel, the mandrel could be made from rubber instead of the more common solid thermoplastic material. However, a rubber mandrel tends to wear quickly and for bigger outer diameters the tolerance on the dimension is high, which is undesired for mass production of hoses.

Solid thermoplastic, flexible mandrels are suitable for smaller hose diameters, but have the disadvantage that a residual film is left on the thermoplastic mandrel after a hose has been extruded over the mandrel. This residual film is called in the field "snake skin" and needs to be removed when a next length of hose is to be manufactured with the mandrel. It should also be prevented that the snake skin is left behind in the manufactured hose, as this could cause blockages in the hose.

Another disadvantage of thermoplastic, flexible mandrels is the chance on pinhole formation. In order to prevent such pinhole, the extrusion process needs to be carefully controlled.

Solid thermoplastic, flexible mandrels are typically too stiff for mandrel diameters starting at size −20 SAE (31.4 mm). For said sizes and above typically a non flexible mandrel is used and the length of the hose to be manufactured is limited.

SUMMARY

In an embodiment, the present invention provides a hose extrusion mandrel for manufacturing rubber hoses, comprising: a solid thermoplastic, elongate core; and a rubber compound outer layer covering a surface of the elongate core.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
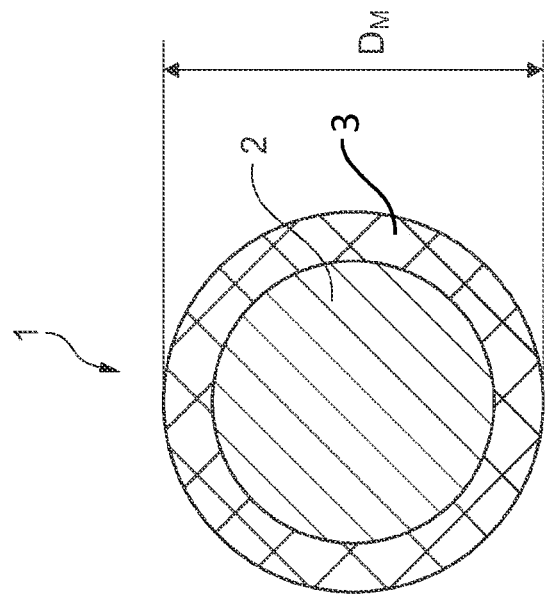
FIG. 1 shows a cross sectional view of an embodiment of a hose extrusion mandrel according to the invention.
Figure 1:
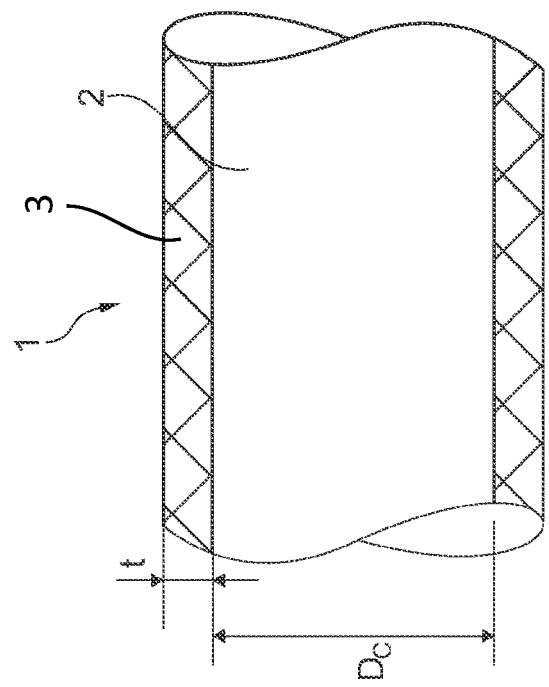

In an embodiment, the present invention reduces the above mentioned disadvantages.

In an embodiment, the present invention provides a hose extrusion mandrel for manufacturing rubber hoses, which hose extrusion mandrel comprises:

a solid thermoplastic, elongate core;

a rubber compound outer layer covering the surface of the elongate core.

Because the hose extrusion mandrel has a thermoplastic core covered by a rubber compound layer, the diameter of the core and thus of the thermoplastic material can be smaller, such that the flexibility is less impacted when the outer diameter of the hose extrusion mandrel is increased. This allows for hose extrusion mandrels with outer diameters of size −20 SAE (31.4 mm) and over, which still can be wound around a reel and which allows for the production of longer lengths of hoses.

Although the solid thermoplastic, elongate core is covered by a rubber compound layer, it has been found, that the wear of the rubber compound layer is considerably used compared to a full rubber compound hose extrusion mandrel and has a smaller tolerance in the outer diameter compared to a rubber mandrel.

A further advantage of the hose extrusion mandrel according to the invention is that the rubber compound layer does not show the snake skin effect nor the problem of pinhole formation.

Thus the hose extrusion mandrel of the invention allows for larger outer diameters, while still being able to wind the mandrel on a reel, and the snake skin effect and pinhole problem is prevented.

Preferably, the ratio between the diameter of the core and the thickness of the rubber compound layer is between 8 and 11. Within this range an optimal flexibility of the mandrel and reduction of the wear of the rubber compound layer is obtained.

In a preferred embodiment of the hose extrusion mandrel according to the invention the diameter of the core is at least 24 millimeter.

Examples of the dimensions of the hose extrusion mandrel are:

a core diameter of 24.8 mm-25.4 mm with a rubber compound layer thickness of 3.0 mm-3.3 mm to arrive at a hose extrusion mandrel of size −20 SAE (31.4 mm diameter).

a core diameter of 37.4 mm with a rubber compound layer of 3.0 mm to arrive at a hose extrusion mandrel of size −24 SAE (37.4 mm diameter)

In a further preferred embodiment of the hose extrusion mandrel according to the invention the solid thermoplastic, elongate core is of polypropylene or polyamide.

Preferably, the rubber compound outer layer is of Ethylene propylene diene rubber (EPDM) or acrylonitrile butadiene rubber (NBR).

The invention further relates to a method for manufacturing rubber hoses, which method comprises the steps of:
 providing an extruder having a die with a die opening;
 providing a hose extrusion mandrel according to the invention, which hose extrusion mandrel has an outer diameter smaller than the die opening;
 extruding a rubber mass through the die opening;
 advancing the hose extrusion mandrel together with the extruded rubber mass through the die opening, such that the hose extrusion mandrel is lined with a layer of the extruded rubber mass.

By advancing the hose extrusion mandrel together with the extruded rubber mass, the tolerance of the inner diameter of the hose is maintained while the extruded rubber mass is subjected to further process steps.

Due to the rubber compound layer of the hose extrusion mandrel according to the invention, the extruded rubber mass will not show the snake skin effect, such that a better quality hose is provided with the manufacturing method according to the invention.

A preferred embodiment of the method further comprising the steps of:
 braiding a reinforcement layer around the hose extrusion mandrel being lined with the layer of the extruded rubber mass, downstream of the die opening;
 extruding a covering layer of rubber mass around the hose extrusion mandrel being provided with the reinforcement layer to cover the reinforcement layer.

With the hose extrusion mandrel still inserted in the extruded rubber mass, the extruded tube can easily be provided with a reinforcement layer and cover layer, while the tolerance of the inner diameter is maintained.

In a further preferred embodiment of the method according to the invention the hose extrusion mandrel is provided wound on a reel and the hose extrusion mandrel is supplied to the die opening by unwinding the hose extrusion mandrel from the reel.

Due to the increased flexibility of the hose extrusion mandrel according to the invention, it is possible to manufacture hoses with larger inner diameters, while still having the advantage of longer lengths of hoses, as the mandrel can be wound on and unwound from a reel.

Yet a further embodiment of the method according to the invention comprises the further steps of:
 after a length of hose is manufactured, cutting the rubber mass at the die; and
 removing the hose extrusion mandrel from the manufactured length of hose.

FIG. 1 shows a hose extrusion mandrel 1, which has a solid thermoplastic elongate core 2, preferably made out of polypropylene or polyamide. The outer surface of the core 2 is covered by an outer layer 3, which is preferably made out of Ethylene propylene diene rubber (EPDM) or acrylonitrile butadiene rubber (NBR).

The core 2 has a diameter $D_c$ of for example 31.4 millimeter. The thickness t of the outer layer 3 is for example 3 millimeter, such that the resulting hose extrusion mandrel 1 has an outer diameter $D_m$ of 37.4, which corresponds to a size −24 SAE. The ratio between the diameter $D_c$ of the core 2 and the thickness t of the rubber compound outer layer 3 is thus in this example 10.5.

Figure 2:
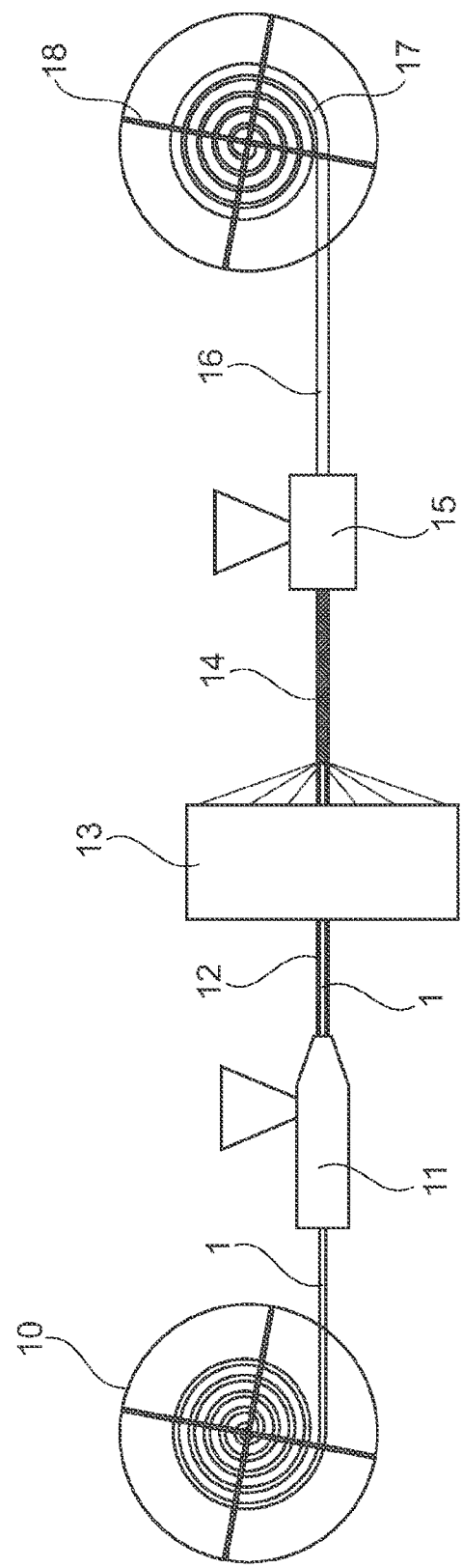
FIG. 2 shows a schematic view of an embodiment of a method according to the invention.

FIG. 2 shows schematic an embodiment of a method for manufacturing a hose according to the invention. A hose extrusion mandrel 1, as shown in FIG. 1, is wound on a reel 10 and supplied therefrom to an extruder 11. The extruder 11 extrudes a rubber mass 12 around the hose extrusion mandrel 1, such that a hose is shaped around the mandrel 1.

The mandrel 1 together with the hose shaped rubber mass 12 is fed through a braiding device 13, which braids a reinforcement layer 14 around the hose shaped rubber mass 12.

The mandrel 1, hose 12 and reinforcement layer 14 are fed together to a second extruder 15, which extrudes a cover layer 16 around the reinforcement layer 14.

The resulting braided hose 17 is then wound on a reel 18, while the hose extrusion mandrel 1 is still present in the hose 17. This extrusion mandrel 1 is removed from the hose 17 after the full hose extrusion mandrel 1 has passed through the extruder 11, the braiding device 13 and the second extruder 15.

The embodiment shown in FIG. 2 is an inline process. The method according to the invention not only includes such an inline process, but also step by step processes.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hose extrusion mandrel for manufacturing rubber hoses, comprising:
   a solid thermoplastic, elongate core having a diameter of at least 24 millimeters; and
   a rubber compound outer layer covering a surface of the elongate core,
   wherein the outer layer directly contacts the surface of the elongate core, and
   wherein a ratio between a diameter of the core and a thickness of the rubber compound layer is between 8 and 11.

2. The hose extrusion mandrel of claim 1, wherein the solid thermoplastic, elongate core comprises polypropylene or polyamide.

3. The hose extrusion mandrel of claim 1, wherein the rubber compound outer layer comprises ethylene propylene diene rubber (EPDM) or acrylonitrile butadiene rubber (NBR).

4. The hose extrusion mandrel of claim 1, wherein an outer diameter of the elongate core and the outer layer combined is at least 31.4 millimeters.

5. A method for manufacturing rubber hoses, comprising:
   providing an extruder having a die with a die opening;
   providing the hose extrusion mandrel of claim 1, which hose extrusion mandrel has an outer diameter smaller than the die opening;
   extruding a rubber mass through the die opening; and
   advancing the hose extrusion mandrel together with the extruded rubber mass through the die opening so that the hose extrusion mandrel is lined with a layer of the extruded rubber mass.

6. The method of claim 5, further comprising:
   braiding a reinforcement layer around the hose extrusion mandrel lined with the layer of the extruded rubber mass, downstream of the die opening; and
   extruding a covering layer of rubber mass around the hose extrusion mandrel provided with the reinforcement layer to cover the reinforcement layer.

7. The method of claim 5, wherein the hose extrusion mandrel is provided wound on a reel, and
   wherein the hose extrusion mandrel is supplied to the die opening by unwinding the hose extrusion mandrel from the reel.

8. The method of claim 5, further comprising:
   after a length of hose is manufactured, cutting the rubber mass at the die; and
   removing the hose extrusion mandrel from the manufactured length of hose.

* * * * *